April 5, 1960     W. P. BIGLER ET AL     2,931,236
SHOCK ROLLER ASSEMBLY
Filed Oct. 20, 1958
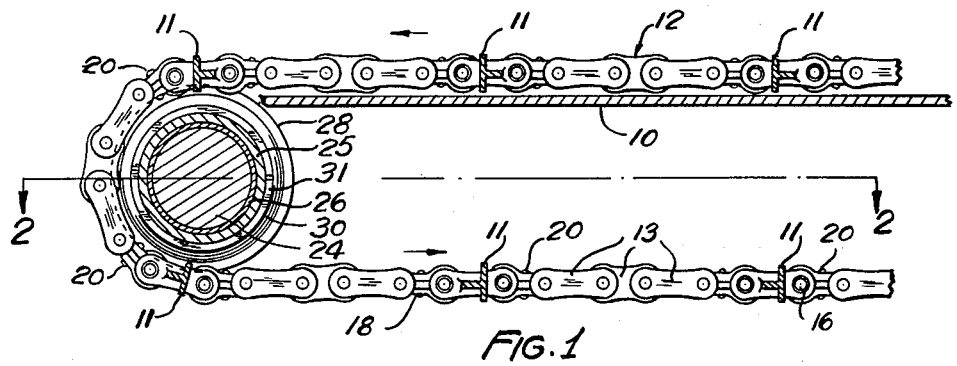
FIG. 1
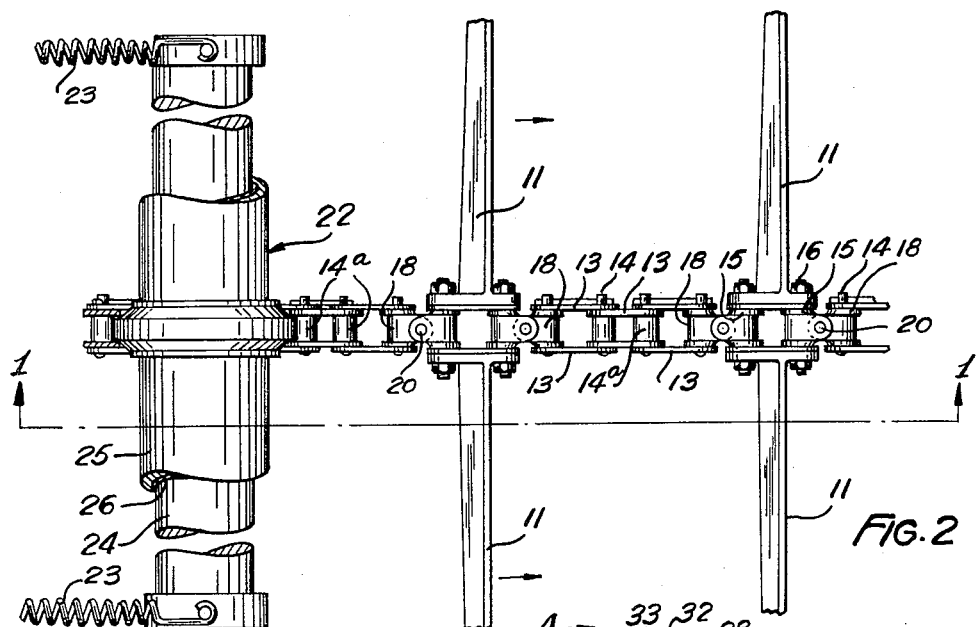
FIG. 2
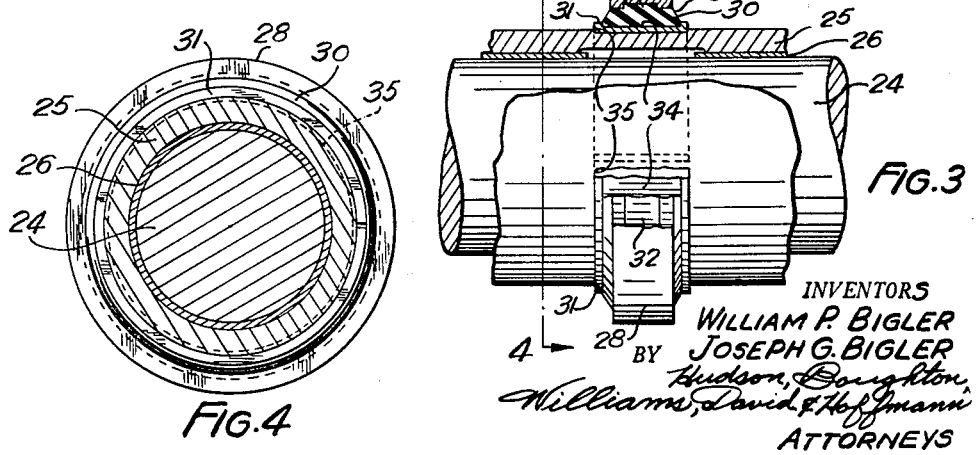
FIG. 3
FIG. 4
INVENTORS
WILLIAM P. BIGLER
JOSEPH G. BIGLER
BY Hudson, Boughton,
Williams, David & Hoffmann
ATTORNEYS

2,931,236

SHOCK ROLLER ASSEMBLY

William P. Bigler, Chagrin Falls, and Joseph G. Bigler, Willoughby, Ohio

Application October 20, 1958, Serial No. 768,343

4 Claims. (Cl. 74—230.01)

The present invention relates to shock roller assemblies and, more particularly, to a shock roller assembly adapted for use as an idler roller in a conveyor which includes spaced material conveying flights which are attached to a chain.

In mining machinery and the like, material is often conveyed from one point to another by material conveying flights mounted on a chain which moves through an endless path. One portion of the path is adjacent a surface having the material to be moved thereon and the flights on the chain engage the material and effect the transportation of the same as the chain is moved through its endless path. At the end of the material conveying run of the chain, the chain and the flights commonly pass over an idler roller which marks the beginning of the return run of the chain. This idler roller is conventionally biased to function as a take-up roller.

In one type of conveyor, the chain supporting the material conveying flights is conventionally made up of a plurality of links each connected to the adjacent link for pivotal movement about an axis parallel to the axes of the idler and driving roller for the chain, and the material conveying flights are connected into the chain as links thereof by a universal type connecting means which includes a pivot pin permitting movement about the aforementioned axis and a pivot pin that permits movement about an axis perpendicular to the axes and peripheries of the idling and driving rollers as the pin passes over the peripheries thereof. This latter axis is perpendicular to the axis of the idler roller when the pivot pins are passing thereover and the pivot pins and idler rollers are subject to a pounding which is hard on both the pins and the roller. This pounding, which effects a reduction in the life of the chain and roller, is costly especially since the type of chain described is a relatively high cost item. An important object of the present invention is to provide a shock roller assembly for cushioning the shock to the pins and roller as a result of the described pounding action and also to provide a shock cushioning roller having a new and an improved simplified construction which provides a minimum of connecting parts and enables the roller assembly to be readily and easily assembled.

Another object of the present invention is to provide a shock cushioning roller assembly having a new and an improved construction which facilitates the replacement of damaged or worn parts of the assembly.

Further objects and advantages of the present invention will be apparent from the following detailed description of the preferred embodiment and are made with reference to the accompanying drawing forming a part of this specification for all material shown therein and in which:

Fig. 1 is a fragmentary sectional view of a chain conveyor including a shock roller embodying the present invention;

Fig. 2 is a plan view of the conveyor shown in Fig. 1 with parts thereof indicated schematically;

Fig. 3 is a fragmentary elevational view of the roller assembly of the conveyor of Figs. 1 and 2 with parts of the assembly cut away; and Fig. 4 is a sectional view taken approximately along line 4—4 of Fig. 3.

The present invention is shown as embodied in a chain conveyor having material moving flights for engaging and moving material on a flat member supported adjacent one run of the endless chain. Referring to Fig. 1, material supported on a conveyor pan 10 is moved therealong by the engagement therewith of material carrying flights 11 carried by and spaced along the length of the endless chain 12. The endless chain 12 is supported so that one run thereof, the upper run in Fig. 1, passes over the surface of the pan 10 so that the material carrying flights thereon engage the material on the pan 10 and move it in the direction of movement of the chain.

As is shown in Figs. 1 and 2, the chain 12 is made up of a plurality of links, each link being comprised of spaced parallel side members 13 connected to the adjacent links by pivot pins 14 which connect the links for relative pivotal movement about axes parallel to the axes of the idling and driving rollers for the endless chain 12. The side members 13 of alternate links are spaced by spacer members 14a which receive the pins 14 and the side members of the other links disposed between the alternate links have a wider spacing than the side members of the alternate links so that the side members of the adjacent alternate links may be received therebetween. The material carrying flights 11 extend from each side of the chain 12 and are carried by members which are connected into the chain 12 as links thereof. Each material carrying flight 11 is supported by two link members 15 and is connected to the link members 15 by a pivot pin 16 which permits the link members 15 to pivot relative to the flight members about axes parallel to the axes of the driving and idler rollers for the chain. Each of the link members 15 is connected to an adjacent link member 18 by a pivot pin 20 which permits relative pivotal movement about an axis parallel to the plane containing the endless chain 12 and perpendicular to the plane of the conveyor pan 10 and the idler and driving rollers for the chain when the link members are passing thereover. Each link member 18 is also a spacing member to space the side members 13 of the adjacent chain link and the members 18 are received between the side members 13 of the adjacent link and are connected thereto by one of the pivot pins 14. The structure as thus far described is conventional and, therefore, has not been described in detail and has been set forth to provide an understanding of one type of apparatus with which a shock roller assembly embodying the present invention may be utilized. While a shock roller assembly embodying the present invention has particular utility when placed in the above-described environment, since the pivot pins 20 and rollers are not subjected to the usual undesirable pounding, it is to be understood that it may also be utilized in other types of conveyors and with different types of chains.

As shown in Figs. 1 and 2, the endless chain 12 is supported, in part, by an idler roller assembly 22 and in the illustrated embodiment, the idler roller assembly reverses the direction of movement of the chain at the end of its working run to begin the return run. The shock roller assembly 22 comprises a shaft member 24 which is movably supported by the frame of the assembly in a conventional manner so as to be movable to take up slack in the endless chain 12 and is shown as being biased in the direction of movement of the upper run by springs 23 connected to the opposite ends of the shaft member 24. The particular manner of movably supporting the shaft member 24 is not a part of the present invention and has not, therefore, been shown or described. The connection of the springs 23 are shown diagrammatically and any suitable biasing means may be utilized.

In addition to the shaft 24, the roller assembly includes a cylindrical sleeve or bushing 25 rotatably supported on the shaft 24. The sleeve or bushing 25 may be internally lined with a bearing material 26, if so desired, and suitable lubrication means may be provided in the construction thereof to facilitate its rotation on the shaft member 24. The bushing 25 has disposed thereabout an annular member 28 which is adapted to be received between the spaced side members 13 of all the links of the chain 12 and to ride on the spacer members 14a, 18. The annular member 28 is resiliently connected to the bushing 25 by a layer of resilient material 30 disposed between the annular member 28 and an annular band 31 on the periphery of the bushing 25. The resilient layer 30 is preferably formed of rubber-like material and in the illustrated embodiment has an annular projection 32 on the periphery thereof which is disposed in a receiving groove 33 in the interior side of the annular member 28. The band 31 has an annular recess 34 in the outer periphery thereof which receives the innermost portion of the layer 30 and limits the axial movement of the layer 30 relative to the band 31. The layer 30 is preferably wider at its inside diameter than at its outside periphery and has tapering sides 30a which extend inwardly and outwardly from the outer periphery of the layer 30.

The bushing 25 of the shock roller assembly 22 has an annular groove which receives the band 31, the groove having side walls or shoulders 35 which form abutment means at the opposite ends of the circular band 31 to limit its movement axially of the bushing 25. The band 31 is preferably a split band so that the diameter thereof may be expanded and contracted for reasons explained hereafter.

When a shock roller assembly constructed as described is utilized, the life of the chain and roller assembly is materially increased since the pounding of the pins 20 and the roller assembly is cushioned as the pins 20 ride over the shock roller assembly. In addition to cushioning the pounding, the shock roller assembly and pins used in the type of conveyor shown in the drawing will often receive a pounding which is the combined result of the action of the pins 20 and the swinging of the conveyor. The type of conveyor shown is often mounted for swinging movement in an arc and this swinging movement will contribute to the pounding of the shock roller assembly 22 and pins 20 since the roller assembly functions as both an idler roller and a take-up roller and the swinging in the arc of the conveyor will, at times, cause the endless chain 12 to tighten or slacken.

The construction of the shock roller assembly also facilitates the assembly thereof and the replacement of worn or damaged parts. In assembling the shock roller assembly, the layer of rubber-like material 30 is first assembled in place within the annular chain engaging member 28. The band 31 may then be contracted by applying an inwardly directed diametral force thereto and inserted within the rubber-like layer 30, with the rubber-like layer being receiver in the groove in the band 31. After the annular member 28, the rubber-like layer 30, and the band 31 have been assembled as a unit in their proper relationship, the unit may be slipped over the end of the sleeve or bushing 25 and moved along the bushing 25 until the band 31 is received in the band receiving groove in the periphery of the bushing. It will be noted that the resiliency of the rubber-like layer 30 will permit the band 31 to be expanded to slip over the bushing 25 and will aid the inherent resilience of the band 31 in effecting resilient engagement of the split band 31 in its receiving groove in the bushing 25 to assure that the band remains in its recess on the bushing. The shoulders 35 at the opposite ends of the band 31 will prevent axial movement of the band relative to the bushing 25.

If the annular member 28 becomes damaged or worn, the band 31 may be snapped out of its receiving recess in the bushing 25 and removed therefrom together with the annular member 28 and the rubber-like layer 30. If desired the bushing 25 may be provided with a recess or groove which permits a prying tool to be slipped under the split band 31 adjacent one end thereof. After the unit has been removed from bushing 25, the annular member 28, the rubber-like layer 30, and the band 31 may be disassembled by applying a force to contract the split band 31 to provide clearance for disassembling the parts. The parts which are then worn or damaged may be reassembled with new parts that replace the worn or damaged parts or, if desired, an entirely new unit comprising the band 31, the rubber-like layer 30, and the annular member 28 may be provided.

While the band 31, the rubber-like layer 30, and the annular member 28 have been shown as assembled without a permanent bond or connection therebetween, it is to be understood that these parts may be assembled in the manner described and then bonded to form a permanently assembled unit which is slipped over the bushing 25 in the manner described above. Furthermore, the layer 30 may be molded in place by assembling the split band 31 and the annular member 28 in their proper relationship and then introducing castable rubber-like liquid between the band and the member 28 to form the layer 30.

While the present invention has been described and shown as embodying a particular type of conveyor, it will be understood that it may be embodied in other apparatuses where it is desired to minimize the shock effect imparted to a roller and in other apparatuses where it is desired to effect a relatively easy assembly and disassembly of shock roller parts.

While the preferred embodiment of the present invention has been described in considerable detail, it is understood that further constructions, modifications, and arrangements will appear to those skilled in the art and it is hereby our intention to cover all such modifications, constructions, and arrangements which fall within the ability of those skilled in the art and within the spirit and scope of the described invention.

Having thus described our invention, we claim:

1. A roller assembly for an endless chain, said roller assembly comprising a generally cylindrical member adapted to be supported for rotation about the axis of the member, a split band disposed on and around a portion of said cylindrical member, abutment means on said cylindrical member extending radially outwardly of said portion and disposed to limit the endwise movement of the band on the cylindrical member, an annular chain-engaging member disposed about said split band, and means comprising an annular shock-absorbing layer of compressible material disposed intermediate said band and annular member and supporting said annular member about said band, said band being split so as to be discontinuous and to permit expansion of said band and said band in said assembly yieldably tending to assume a diameter smaller than that required to telescope over said abutment means and said layer being compressible to permit expansion of said band to clear said abutment means, said layer and said annular member having annular rib means on one received in a groove in the other and cooperating to hold said layer and annular member against relative axial movement.

2. A roller assembly for a chain which exerts lateral forces on the roller assembly, said roller assembly comprising a cylindrical member adapted to be supported for rotation about the axis of the member, a band disposed on and around a portion of said cylindrical member, abutment means on said cylindrical member extending radially outwardly of said portion and disposed to limit the endwise movement of the band on the cylindrical member, an annular chain-engaging member disposed about said band, and means comprising an annular shock-absorbing layer of resilient rubber-like material disposed intermediate said band and said annular member and supporting said annular member about said band for yieldable movement in the plane of the annular member and relative to the band, said band being split so as to be circumferentially discontinuous and to permit expansion thereof and said band in said assembly yieldably tending to assume a diameter smaller than that required to telescope over said abutment means and said layer being compressible to permit expansion of said band to clear said abutment means, said annular layer of material being of greater axial extent adjacent said band than adjacent said annular member and having converging tapered sides extending from said band to said annular member.

3. A roller assembly as defined in claim 2 wherein said cylindrical member has an annular groove therein for receiving said band, said groove having side walls lying in planes substantially perpendicular to the axis of said cylindrical member and providing said abutment means and said sides of said layer having portions radially inwardly of the tapered portions thereof which lie in planes substantially perpendicular to said cylindrical member and which engage the side walls of said groove.

4. A roller assembly as defined in claim 2 wherein said layer and said annular member have cooperating rib means on one received in a groove in the other which cooperate to hold said layer and annular member against relative axial movement.

References Cited in the file of this patent

UNITED STATES PATENTS

| | | |
|---|---|---|
| 1,909,100 | Geyer | May 16, 1933 |
| 2,101,172 | Gegenheimer | Dec. 7, 1937 |
| 2,390,168 | Piot | Dec. 4, 1945 |
| 2,667,263 | Bigler et al. | Jan. 26, 1954 |
| 2,701,971 | Carter et al. | Feb. 15, 1955 |